United States Patent [19]

Ruhl

[11] Patent Number: 4,633,270
[45] Date of Patent: Dec. 30, 1986

[54] TRANSPORTATION EQUIPMENT RECORDER FOR HIGHLIGHTING OPERATING PARAMETERS OUTSIDE OF PRESET LIMITS

[76] Inventor: Hermann Ruhl, 133 Richmond St. West, Toronto, Ontario, Canada, M5H 2L7

[21] Appl. No.: 777,923

[22] Filed: Sep. 19, 1985

Related U.S. Application Data

[63] Continuation of Ser. No. 486,388, Apr. 19, 1983, abandoned, and Ser. No. 486,207, Apr. 18, 1983, abandoned.

[30] Foreign Application Priority Data

Apr. 22, 1982 [CA] Canada ................................. 401496

[51] Int. Cl.$^4$ ............................................ G01D 15/10
[52] U.S. Cl. ..................................... 346/49; 346/45
[58] Field of Search ............... 346/18, 33 D, 49, 52, 346/45; 73/126; 434/65

[56] References Cited

U.S. PATENT DOCUMENTS 3,706,047 12/1972 Bauer .................................. 346/18
4,358,272 11/1982 Gurtner .............................. 346/49

Primary Examiner—Arthur G. Evans

[57] ABSTRACT

The present invention provides a measuring and recording system for transportation equipment which measures the values of various operating parameters of the equipment and which records these values in analogue fashion on a recording medium. The system is characterized by an electronic signaler which causes readily visible markings to be produced on the recording medium distinct from the analogue recording pattern and independent from the analogue recording level when any of the operating parameters reaches a certain preset value.

16 Claims, 8 Drawing Figures

FIG.1.
FIG.1A.
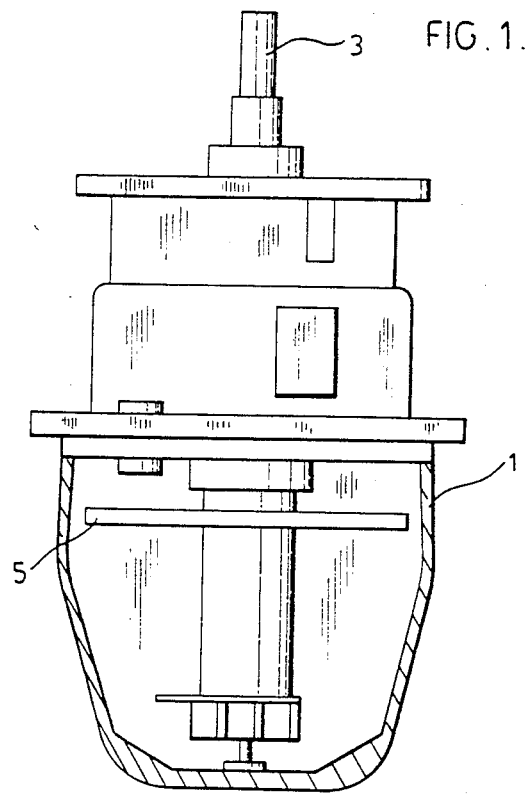
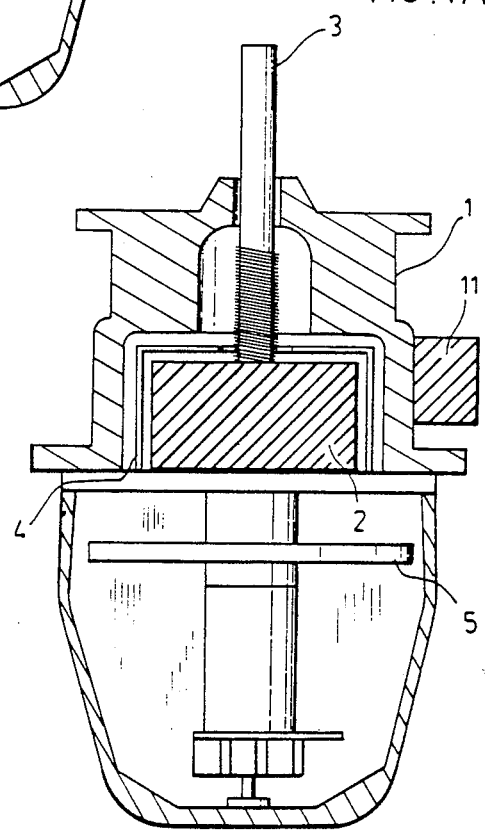

TRANSPORTATION EQUIPMENT RECORDER FOR HIGHLIGHTING OPERATING PARAMETERS OUTSIDE OF PRESET LIMITS

This is a continuation of application Ser. No. 486,388 filed 4/19/83 and Ser. No. 486,207 filed 4/18/83 both now abandoned.

FIELD OF THE INVENTION

The present invention relates to a transportation equipment system for measuring the values of various operating parameters of the equipment and for recording the values on a recording medium in a manner such that when any one of the measured parameters reaches a preset limit a marking pattern other than that normally recorded and which is readily visible is produced on the recording medium by the system.

BACKGROUND OF THE INVENTION

Operating parameter recorders for transportation equipment are usually installed to provide owners with supervisory control through the information provided on the recorders over the operation of the equipment. Efficient operation requires that certain operating parameters such as driving speed, engine rpm, etc. be kept within certain limits which are controlled by the driver, pilot or crew of the equipment.

The most popular types of recorders are ones which visibly record the parameters in analogue fashion on tapes or circular recording disks. For practical purposes, such as the insertion and removal of the recording medium, these recorders must be accessible to the operating personnel. However, access to the recording medium also allows access to the recording mechanism including the stylus which actually records the information on the medium. Accordingly, the operating personnel are able to tamper with the recording mechanism such that the recordings are not accurate. For example, it is highly desirable that transportation equipment such as large trucks and the like be operated at safe and economical speeds however the operating personnel for various reasons often like to run the equipment above these safe and economical speeds. The personnel therefore readjust the stylus such that the analogue values shown on the recording medium appear as being lower than the actual values. The type of adjustment or tampering done to the recording medium depends on the design of the particular recorder. For example, the operating personnel may bend the recording stylus downwardly or they may attach rubber bands, additional springs, etc. to limit the travel of the stylus for altering the recorded value for the operating parameters.

Although these tampering methods can be depicted by trained chart interpreters who are familiar with the characteristics of a particular recorder detection still requires more than just a casual glance analysis of the recordings. Furthermore, untrained interpreters may not be able to recognize an altered recording pattern since there is very little on the recording medium itself to indicate tampering to the recording stylus.

SUMMARY OF THE PRESENT INVENTION

The present invention provides a measuring and recording system for transportation equipment in which tampering to the recording mechanism is easily recognized even by relatively untrained personnel through a very quick study of the recording medium. More particularly the present invention provides a system having first measuring means for measuring values of various operating parameters of the equipment, for recording such values in analogue fashion on a recording medium and being characterised by an electronic signaling means having preselected input values for one or moreof the operating parameters and being adapted to provide output signals when the true as opposed to recorded value for the one or more operating parameters reaches the input value for that particular parameter. This system further includes recording means responsive to the electronic signaling means for visually indicating these output signals directly on the recording medium. The visual indication for the output signals appear in a distinctive pattern and are therefore very apparent on the recording medium.

The input values to the electronic signaling means are preferrably selected such that they represent critical limits for the operation of the equipment whereby the visual indications of the output signals indicate a vehicle operation outside of these critical limits. In addition the recording means may be the same recording means which is used for the analogue recording of the operating parameters and which is momentarily moved out of its normal recording pattern for visually indicating the output signals from the electronic signaling means. On the other hand the recording means for visually indicating these output signals may be a separate and distinct recording means independent of the analogue recorder.

The visual indications for the output signals from the electronic signaling means may be produced in a number of different ways. For example, these visual indicators may be in the form of markings on the recording medium which only appear in conjunction with the output signals. However the visual indicators may also be provided as a break in a recording pattern which is normally continuous and which is only discontinued in the event of output signals from the electronic signaling means. This particular arrangement has the added benefit that the operating personnel cannot hide visual indications of the output signals by supressing movement of a recording stylus or the like to the recording medium.

According to the present invention the moment that specific values relating to for instance, road speed or engine rpm are outside of preset limits separate visual indications apart from the analogue recordings appear produced on the recording medium and if the recording system is not tampered with these values will simultaneously be recorded in analogue fashion by the analogue recorder on the recording medium. If there is any tampering with the analogue recording the reaching of these critical values is still shown by the separate control recordings and the tampering becomes evident if the simultaneous analogue recordings do not agree with the control recording.

The provision of these separate control recordings not only visually indicates tampering to the system but in addition visually indicates misleading recordings caused by improper calibration of the system or instrument malfunctions. If for example the output signal recordings occur while the analogue recordings are inside the preset limits for the output signal recordings it immediately becomes apparent that the analogue recorder is out of proper adjustment and requires recalibration.

The normal analogue recordings made on a transportation equipment recorder require, due to the limited recording space, very accurate reading and because of the small graduations on the recording medium any violations resulting from excessive speed or the like can only be interpreted through extreme care and attention to the normal recordings. However, through the use of a separate electronic signal sending system the visual indications can be made such that they are highly recognizable for areas of operating parameter violations.

The system can additionally be arranged to include visible or audible warnings to the operator in the event of operating parameter violations. Furthermore the warning outputs from the system can also be used as an input into devices for automatically limiting or governing the speed of the equipment engine. According to present systems these governing devices are usually activated by the analogue recorder and their operation which is dependent upon accurate analogue recordings are therefore affected by tampering or improper calibration of the analogue recorder. These problems do not occur according to the present invention since such tampering and improper calibration do not affect the electronic signaling means.

BRIEF DISCUSSION OF THE DRAWINGS

The above as well as other advantages and features of the present invention will be described in greater detail according to the preferred embodiments of the present invention in which:

FIG. 1 is a plan view of a typical speed pick up device used for measuring engine rpm and road speed in many different types of road vehicles;

FIG. 1a shows a cross-section of the speed pick up device of FIG. 1;

DETAILED DESCRIPTION ACCORDING TO THE PREFERRED EMBODIMENTS OF THE PRESENT INVENTION

Engine rpm and road speed recording systems are often operated by a rotating magnet system as shown in FIG. 1. This system includes its own speed sensor so that no additional speed sensors need be installed in the device. The device operates in a normal manner to produce engine rpm and road speed recordings through a recording device normally referred to as a tachograph. Furthermore the speed sensor is used according to the present invention and unlike the prior art to operate the speed recording device to additionally produce control recordings indicative of undesirable engine rpm and/or road speed.

Figure 1B:
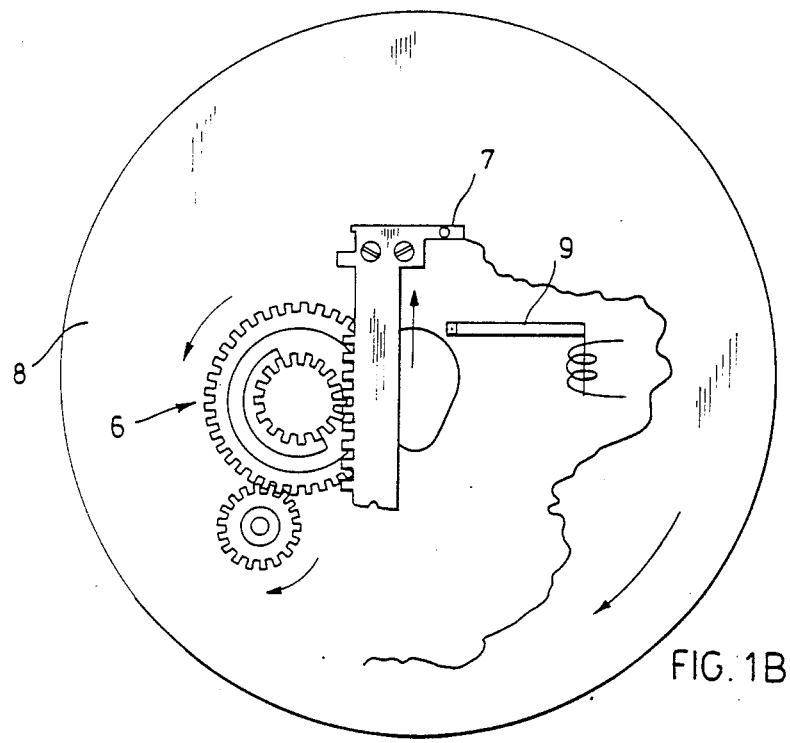
FIG. 1b is a plan view of the internal works of a speed recording device which is operated from the speed pick up device of FIG. 1.

According to FIGS. 1, 1a and 1b, a speed measuring device for a motor vehicle such as a large truck or the like includes a housing 1 having a magnet 2 driven off a flexible shaft 3 from the transmission takeoff of the vehicle. The rotations of the flexible shaft in the magnet are directly proportionate to the distance covered by the vehicle. The magnet when rotating exerts a torque on a cup 4 which is proportionate to the rotational speed of the magnet. The cup is held in the zero position by spring 5 and will only turn from a zero position up to an angle where the torque exerted from the magnet equals the counterforce of the spring. A stylus 7 is geared to the cup by gearing assembly 6 and is moved such that the vertical position of the stylus changes in accordance with the rotational speed of the magnet and the speed of the vehicle, ie. the stylus moves to a higher position with higher speeds and to a lower position with lower speeds. The stylus records a trace on a recording disk 8 which is turned by a clock mechanism within the speed recording device at a constant speed of for example, 1 full revolution for every 24-hours. In accordance with the present invention the system is further equipped with a coil 11 having a magnetic core placed close to the rotating magnet such that the magnetic field of the magnet induces an a/c current of a frequency which is proportionate to the rotational speed of the magnet. Coil 11 is connected through wire connections to an electronic speed switch arrangement which is described later in detail to supply an output pulse when the incoming pulses reach a preset frequency indicative of undesirable speed conditions. The pulse output of the speeds switch is connected to an additional event stylus 9 which produces a wide band recording whenever preset speed is reached or exceeded.

Figure 2:
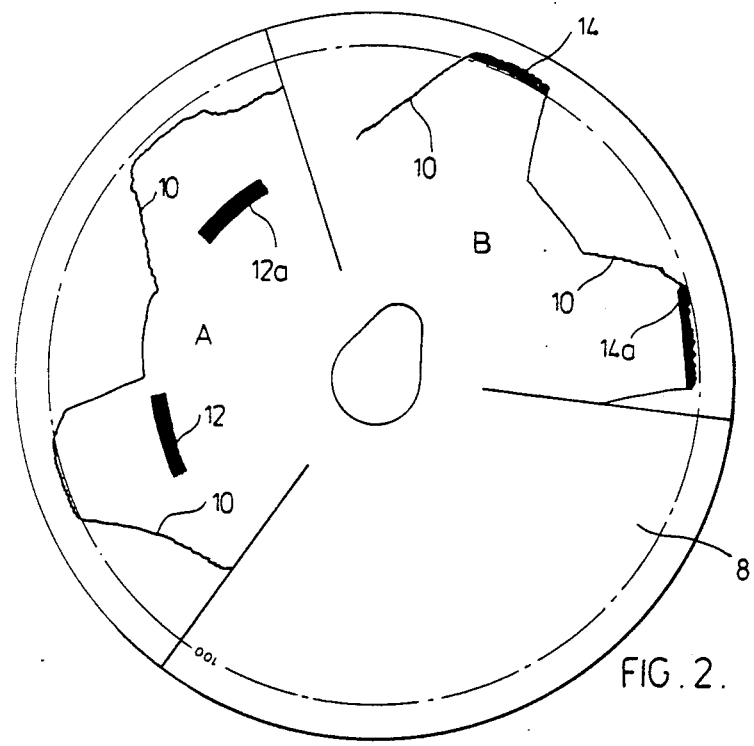
FIG. 2 is a plan view of a chart bearing recordings made by the device of FIG. 1b.

FIG. 2 shows both speed recordings and control recordings. In region A the speed recording is made by stylus 7 while the control recordings are made by stylus 9.

In region A speed recording or trace 10 on Chart 8 shows an initial acceleration of the vehicle up to 100 km/hr which in this particular example has been preset as a maximum acceptible speed limit. Thereafter the speed tracing indicates a speed of over 100 km/hr at which point stylus 9 produces a control recording 12 in the form of a wide band on the chart where the speed recording trace 10 exceeds the value 100 km/hr. The system used to operate stylus 7 to produce the control recordings is described later in detail however it should be noted at this point that the function of the control recording is to immediately draw attention to the undesirable vehicle speed.

Following this initial control recording, the chart shows a period of no speed indicating a stoppage of the vehicle. After the stoppage of the vehicle there appears a second period of speed recording and a control recording 12a. However this control recording occurs while the speed recording is below the acceptible 100 km/hr limit so that it becomes apparent that during the stoppage period an adjustment has been made to the position of the speed stylus. This position adjustment can be achieved for example by increasing the spring tension against the rotating magnet or by providing some type of spring or rubber band pulling the speed recording stylus downwardly. It can also be achieved by simply bending the speed stylus to a lower recording position. However, regardless of any manipulations made to the speed stylus a control recording is produced whenever the vehicle speed actually exceeds 100 km/hr. This is due to the fact that it is extremely difficult to tamper with the rotational input speed of the recording device since the pulse frequency cannot be varied other than by true changes of speed of the vehicle. It is this rotational input speed which is fed to the control stylus through the speed switch which is mounted inside the instrument where it is not accessible to the operating personnel for adjustments.

In a magnetic pick up recorder as described above the analogue stylus for the speed recordings is moved mechanically by the magnetic force transmitted from the rotating magnet to the measuring system. In such an arrangement it is not feasible to subject the analogue recording stylus to a separate electrical control to produce the control recordings. Accordingly, use is made of the event stylus 9 separately from the analogue recording stylus 7.

It is however possible to control the analogue stylus for outside functions when the analogue stylus is electrically operated which allows control recordings to be produced by the analogue stylus when certain specified operating conditions are reached. Under such conditions the analogue recording stylus is subjected to a separate electronic control outside of the analogue system such that the recording or analogue stylus produces a control recording indicative of these operating conditions. A characterisitc recording pattern for this arrangement is shown in region B of FIG. 2 with two different control systems for controlling the analogue stylus being shown in FIGS. 3 and 4 of the drawings.

Returning to FIG. 2, region B again shows both speed recordings and control recordings however, in this region both recordings are made by the same electronically operated recording stylus.

The speed trace 10 in region B shows an initial accelleration up to 100 km/hr and thereafter a speed of over 100 km/hr at which point a control recording 14 appears immediately beneath the speed trace to indicate a speed over the acceptible 100 km/hr limit. The speed trace 10 then shows vehicle stoppage and further acceleration to 90 km/hr at which point a second control recording 14a appears. Consistent with region A this control recording should not in fact appear until the speed trace exceeds 100 km/hr and the apparent early warning produced by the control recording again indicates tampering or miscalibration of the speed stylus since the control recording will in fact only occur at speeds above 100 km/hr regardless of what is indicated by the speed trace since the control recording is operated from actual vehicle speed rather than indicated vehicle speed.

Figure 5:
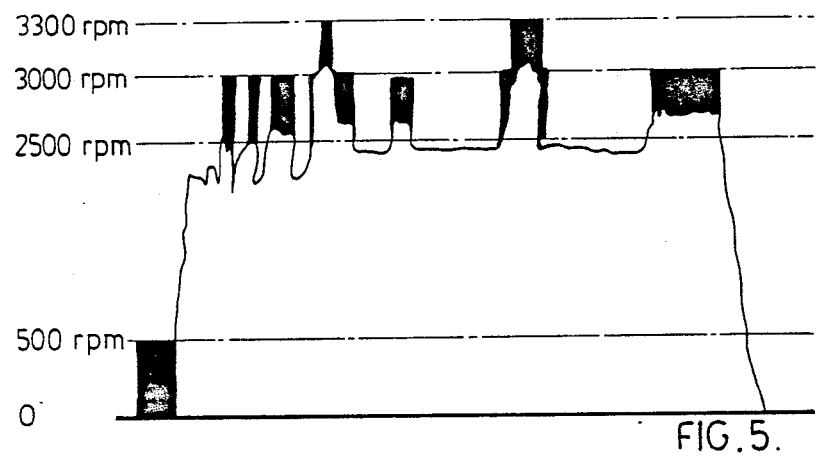
FIGS. 5 and 6 are control recording charts for engine rpm and vehicle speed respectively.

A modification to the recording arrangement shown in region A of FIG. 2 can easily be accomplished to protect the system against interference by the operator by reversing the power connection to the event stylus 10. Accordingly the stylus is permanently connected to power through a normally closed switch such that the stylus continuously records with acceptable speed limits with the switch only being opened by the electronic speed switch whenever the preset speed limit is exceeded to move the event stylus from its normally recording position. With this arrangement a solid black line would be recorded under acceptable limits with breaks or discontinuances in the solid black line appearing as an indication to unacceptable speed limits. The description above relates to vehicle speed and it should be noted that this principle of checking the recording accuracy applies equally as well for instance when used to record engine speed in rpm as shown in FIG. 5 of the drawings. FIG. 5 also shows a sophistication of the control in which the electronic speed switch has two thresholds to provide two outputs according to the vehicle speed. The speed switch is connected to the control recording stylus which is adapted to record two different band widths indicative of different degrees of violation of the acceptable speed limit. This arrangement further eases the reading of the accuracy of the analogue speed recording.

Figure 3:
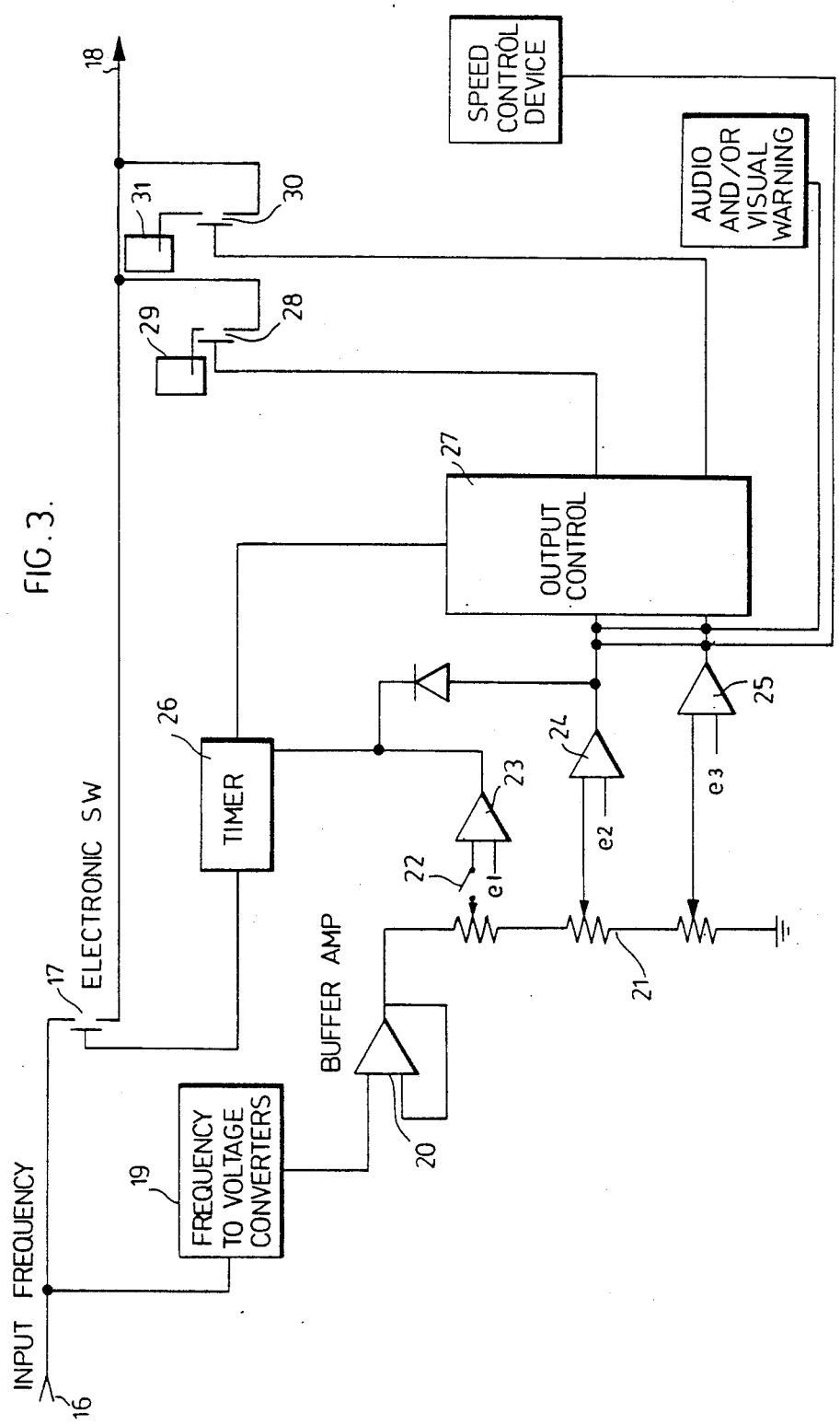
FIG. 3 shows one form of a control system according to a preferred embodiment of the invention for producing control recording through the control device of FIG. 1b.

FIG. 3 shows an arrangement for operating an electronically controlled stylus to produce analogue and control recordings by means of the same stylus. The stylus is electronically controlled by an electric motor which is reversible up and down and moves the stylus according to the direction of rotation of the motor. This motor itself is controlled by an electronic control board which receives input pulses from pulse sending unit with these pulses then being converted in to d/c voltage representative of the driving speed or engine rpm of the vehicle. This stylus is connected with a variable resistor and voltage source so that the variable voltage determines the position of the stylus ranging from a zero position to a maximum range position. This voltage is associated with the position of the stylus as layed out such that the voltage of th stylus system is equal to the voltage from the pulse measuring system when the stylus position on the recording medium corresponds to the speed to be measured and recorded. The motor controlling the stylus is connected to a comparitor which compares the voltage from the speed measuring system with the voltage corresponding to the stylus position and this comparitor then causes an output current to be sent to the motor which will make the stylus move down if the stylus position is too high or to move up if the stylus position is too low in comparing the input frequency to the pulse measuring system.

As mentioned above, one of the advantages of such an arrangement is that the electronic control system for the analogue stylus may be disconnected from the speed recording system and connected to the separate control system as shown in FIG. 3 which takes over the positioning of the stylus.

According to FIG. 3 the pulses from an engine rpm pulse sending unit are connected to point 16 in the control circuit. Point 16 is connected to an output point 18 which applies pulses to an rpm measuring system of the recording instrument through a normally closed electronic switch 17. The input point 16 is also connected to a frequency to voltage converter 19 which provides an output voltage proportionate to the engine rpm. The output voltage of converter 19 is connected through a buffer amplifier 20 to a voltage divider 21. Voltage divider 21 is connected to three speed switches in the form of voltage comparitors 23, 24 and 25 with comparitor 23 being connected to the voltage divider by a driving speed switch 22 which is closed when the vehicle is standing still and which is opened when the vehicle starts to move. This arrangement allows the recording of the undesirable condition of engine operation with the vehicle standing still as follows. Voltage comparitor 23 is connected to an auto-reset timer 26 which when activated opens switch 17 and provides an output to control device 27. Reset timer 26 has an adjustable duty cycle which opens switch 17 for a certain period and provides for the same period an activating pulse to control device 27. During the second period of the duty cycle, switch 17 is closed again and control device 27 is deactivated. This duty cycle is repeated as long as auto-reset timer 26 is activated by a pulse from voltage comparitor 23. Therefore when the vehicle is not moving whereby switch 22 remains closed and the engine is operating, switch 17 is alternately opened and closed to disconnect and then reconnect the rpm measuring system of the recorder in a regular rythm from the input frequency to the recorder. This causes the recording stylus to move from its 0 position on the base line of the recording medium to a higher position corresponding to the actual rpm to produce a very prominent recording pattern as shown in the lower portion of FIG. 5 between the zero line and 500 rpm.

When the vehicle starts to move, switch 22 opens and the electronic switch 17 is closed as long as the engine rpm remains below an acceptable limit of for example 2500 rpm. However, when the engine rpm exceeds this limit a higher voltage is reached to activate comparitor 24 which provides an output signal fed via a diode into the auto-reset timer. This in turn causes switch 17 to once again open with a pulse being sent to the control device 27. This pulse is directed through the control device to an electronic switch 28 closing that switch and connecting output point 18 to the recording device with a frequency generator 29. This frequency generator provides a frequency which is distinctly higher than the recorded engine rpm and as long as comparitor 24 remains activated the stylus of the tachograph is moved through the dutycycle of the timer from its normal recording position to a position corresponding to the frequency of generator 29 to record a pattern between the 2500 and 3000 rpm lines as shown in the upper portion of FIG. 5. This pattern indicates a first level of excessive engine speed where the lower border of the lower solid portion of the recording corresponds to the actual engine rpm while the upper level at 3000 rpm is constant and equal to an engine rpm higher than any normally recorded rpm but below the maximum recording height obtainable from the recording device.

If there is a still higher level of engine speeding then there is a further increase of the input frequency at point 16 through increased pulses caused by the increased rpm. This in turn provides higher voltages which reach the switching point of voltage comparitor 25 to send a pulse to the control device 27. The control switches its output from the connection at switch 28 to the connection at switch 30. As long as this input frequency at point 16 is maintained or exceeded, point 18 will be alternately to frequency generator 31 through switch 30 and the normal input frequency from point 16. The frequency from generator 31 is higher than that generated by frequency generator 29 which means that after the critical engine rpm has been reached triggering the output signal from voltage comparitor 25 the level of recording by the rpm stylus is further elevated producing a heavy recording at the highest level of the stylus between 3000 rpm and 3300 rpm as shown in FIG 5. This prominent recording at the uppermost level indicates an even more severe violation of the maximum desirable engine rpm. Similar to the earlier description this recording pattern of maximum violation has a lower borderline corresponding to the actual rpm and an upper borderline fixed according to the frequency impressed on the stylus in regular intervals by frequency generator 31.

Figure 6:
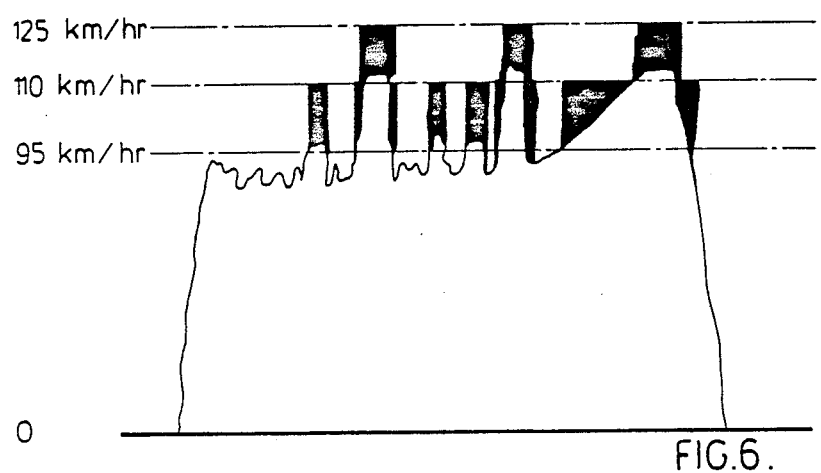

The same principles as used for producing control recordings of the engine rpm can also be used as a control for driving speed violations to produce recording patterns as shown in FIG. 6. This figure shows that whenever speeds over 95 km/hr are reached the recording pattern extends up to 110 km/hr and whenever driving speeds over the 110 limit are achieved the recording pattern reaches up to the 125 km/hr level. Again these violations and their severity are clearly recognizable on the recording medium.

An advantage of the recording system described above which immediately becomes apparent from FIGS. 5 and 6 is that as long as there are no objectionable operating conditions the analogue recording stylus makes its normal recording pattern consisting of thin traced lines. However when one of the undesirable conditions described above occurs this same stylus assumes a regular up and down pattern which creates a heavy dark field on the recording medium very apparently indicating duration and severity of the violations.

In addition this pattern allows an immediate analysis of the recording accuracy of the analogue stylus. The violation recording pattern should only appear when the lower recording edge of the heavy black recording pattern is higher than the lower or higher rpm limits set for the warning pattern by voltage comparitors 24 and 25 respectively. Should this recording pattern occur while the lower edge recordings are lower than the speed limit then this would indicate that the calibration or adjustment of the analogue recording stylus is incorrect. Furthermore any deliberate efforts to make the recordings appear to be lower than they actually are become immediately recognizable on the recording medium.

It should be noted that instead of using a solid black recording caused by very quick up and down movements of the stylus it is also possible to have up and down marking patterns spaced out so that they appear at less frequent intervals for example, every one or two minutes. This arrangement has the advantage of making very brief high speed violations more easily recognizable since the extra speed recording line would appear more clearly than that of a lower limit line of a solid recording block.

Figure 4:
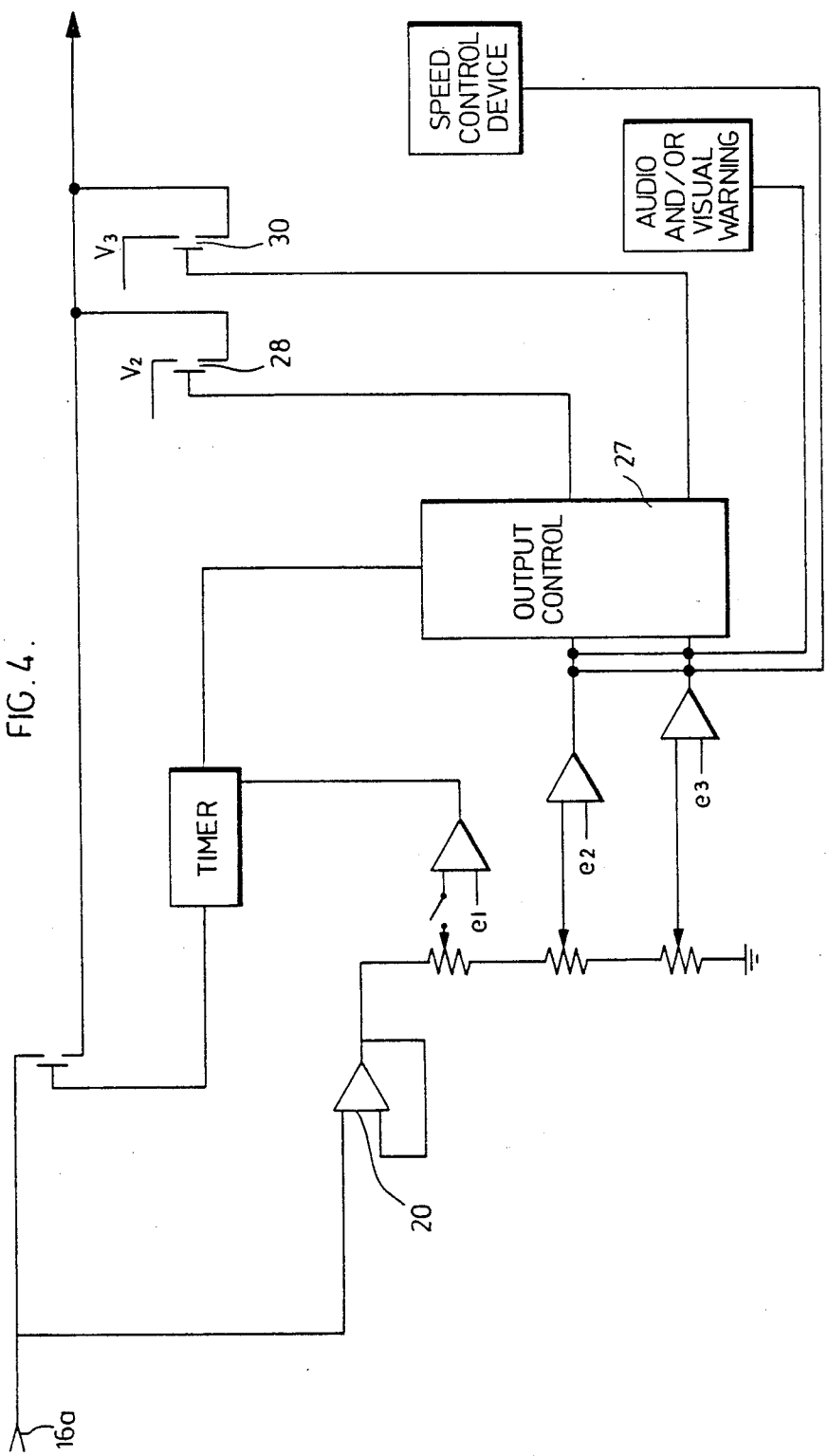
FIG. 4 shows an alternate form of a control system according to a further preferred embodiment of the present invention for producing a control recording to the recorder of FIG. 1b.

A further system for producing control recordings is shown in FIG. 4. This control system is very similar to the control of FIG. 3 with the exception that the input to the control is in the form of a voltage coming directly from a frequency to voltage converter not shown in the drawings but found directly within the rpm or speed measuring system of the recorder. This system therefore allows the elimination of the frequency to voltage converter such that the input 16a is connected directly to the buffer amplifier 20a. In addition this system does not require the use of frequency generators with the voltage switches 28 and 30 shown in FIG. 4 being connected directly to a voltage divider supplying voltages $V_2$ and $V_3$ to the tachograph. Therefore voltage at the input 16a goes directly through the buffer amplifier to the comparitors which compare the measured voltage with the control voltage for the position of the recording stylus. The alternating of the supply voltage between the stylus and the control system would again provide similar recording patterns to those described above with respect to FIGS. 5 and 6.

As is shown in the drawings, control recordings can be produced by the analogue recorder both above and below the normal analogue recording line. The advantages of setting up for the lower control recordings as shown in FIG. 2, is that these recordings cannot be prevented by suppressing the upper travel of the stylus when tampering with the recorder.

The advantage of the control system as described with respect to FIG. 3 is that it can be added to any existing pulse frequency recorder to provide control recordings on the recording medium. The arrangement of FIG. 4 is one which can be used with minor modifications to existing recorders.

As will be seen in FIGS. 3 and 4 each of the lower two switches or comparitors may be connected to warning and/or control systems which visibly or audibly warn the driver of excessive operating parameter values and/or which control the parameters to bring them back to within acceptable limits. As an added benefit, all of the comparitors have an adjustable switch point which is presettable according to desired values for switching of the comparitors.

Although various preferred embodiments of the invention have been described herein in detail it will be appreciated by those skilled in the art that variations may be made thereto without departing from the spirit of the invention or the scope of the appended claims.

The embodiments of the invention in which an exclusive property or privilege is claimed are defined as follows:

1. An operating parameter measuring and recording system for transportation equipment, said system including means for measuring value of at least one operating parameter, means for providing a recorded value in analogue fashion on a recording medium for the operating parameter and means for readily identifying discrepancies between the measured value when outside of a preset limit and the recorded value when differing from the measured value, said means for identifying discrepancies comprising electronic measuring and signalling means settable to a preselected input value for the operating parameter and providing an output signal when the measured, as opposed to the recorded value for the operating parameter reaches the preselected input value, said system further comprising recording means responsive to said electronic measuring and signalling means for providing a highlighted visual indication of such output signal directly on the recording medium for recognition of differences between the recorded and the measured value.

2. A system as claimed in claim 1 wherein said electronic measuring and signaling means provides on/off pulses to said recording means.

3. A system as claimed in claim 1 including a single recording system for recording both the analogue values of the operating parameters and the visual indications of the output signal from said electronic measuring and signaling means.

4. A system as claimed in claim 1 including independent recording systems for recording the analogue values of the operating parameters separately from the visual indications of the output signal from said electronic measuring and signaling means.

5. A system as claimed in claim 1 wherein said recording means is normally away from an output signal recording position and is arranged to move to an output signal recording position to visually indicate the output signal from said electronic measuring and signaling means.

6. A system as claimed in claim 1 wherein said recording means is normally in a signal recording position and is arranged to move out of the signal recording position to visually indicate the output signal from said electronic measuring and signaling means.

7. A system as claimed in claim 2 including switching means which measure frequency of electrical pulses representative of the parameter, said switching means being preset to specific frequency values of the operating parameter to provide the output signal.

8. A system as claimed in claim 2 including switching means which measure voltages representative of the parameter, said switching means being presettable to specific voltage values to provide the output signal from said electronic measuring and signaling means.

9. A system according to claim 1 having at least one magnetic speed measuring system which actuates a recording member for analogue recording of at least one of the operating parameters and including at least one pulse sensor mounted sufficiently close to rotating magnets of the magnetic speed measuring system and activated by a rotating magnetic field thereof, at least one electronic pulse frequency switch with at least one presetable switch point connected to the pulse sensor and at least one additional electrically operated recording member connected to the pulse frequency switch to record when the switch point has been exceeded and allowing comparison of the analogue recordings with the recordings of said electrically operated recording member.

10. A system as claimed in claim 1 wherein said electronic measuring and signaling means comprises at least one electronic pulse frequency measuring system for actuating analogue recording means to record the parameters on the recording medium, said system further including at least one electronic pulse frequency switch with a presetable switch point having an input connected to electric pulse sending circuits of said electronic pulse frequency measuring system and at least one electrically actuated recording means connected to the electronic pulse frequency switch to record where preset switch point values are exceeded and allowing comparison thereof with the analogue recordings.

11. A system as claimed in claim 1 having at least one electronic pulse frequency measuring system for measuring electronic pulses relating to the parameters and controlling analogue recording means to record these parameters on the recording medium, said system further including at least one pulse frequency switch with a presetable switch point, said pulse frequency switch having an input connected to the electrical pulse frequency measuring system, said pulse frequency switch being activated when reaching its switch point, timing means for disconnecting pulse input to the electronic pulse frequency measuring system for a preselected short time period and for connecting the pulse input with a pulse generator preset to a preselected frequency to cause the analogue recording means to record a distinctive pattern between varying analogue recording levels of the measured parameter and a recording level of the preselected frequency from the pulse generator whenever the presetable switch point of the frequency switch is reached thereby identifying and emphasizing operation of the equipment in specified parameter ranges independently of accuracy of the analogue recording of the parameters.

12. A system as claimed in claim 1 including analogue recording means and a voltage switch which is activated by a preselected voltage level, a timer which disconnects the analogue recording means from an analogue recording position for a selected short time period and which connects the analogue recording means with a preset voltage input control causing the analogue recording means to record a distinctive pattern between varying analogue recording levels of the measured parameter and the recording level of the preselected voltage whenever the preset switch point of the voltage switch is reached thereby identifying and emphasizing the operation of the equpment and specifying parameter ranges independently of accuracy of the analogue recording of the parameters.

13. A system as claimed in claim 4 in which at least one of the operating parameters is measured by a primary pulse sending unit connected to an electronic pulse frequency measuring system, a pulse frequency switch with a presettable switch point controlled by the pulse frequency of the primary pulse sending unit, said pulse frequency switch being connected to additional electrical actuated recording means which indicate that preset values are reached.

14. A system as claimed in claim 1 including warning devices operated in conjunction with the output signal from said electronic signaling means.

15. A system as claimed in claim 1 including control devices operated in conjunction with the output signals from said electronic signaling means to keep the operating parameters within specified limits.

16. A system as claimed in claim 8 wherein said switching means are operated by voltages fed to said parameter measuring means.

* * * * *